March 25, 1969  W. B. CONRAD  3,435,107
METHOD OF MANUFACTURING A MOTION TRANSMITTING
REMOTE CONTROL ASSEMBLY
Filed May 18, 1967  Sheet 1 of 2
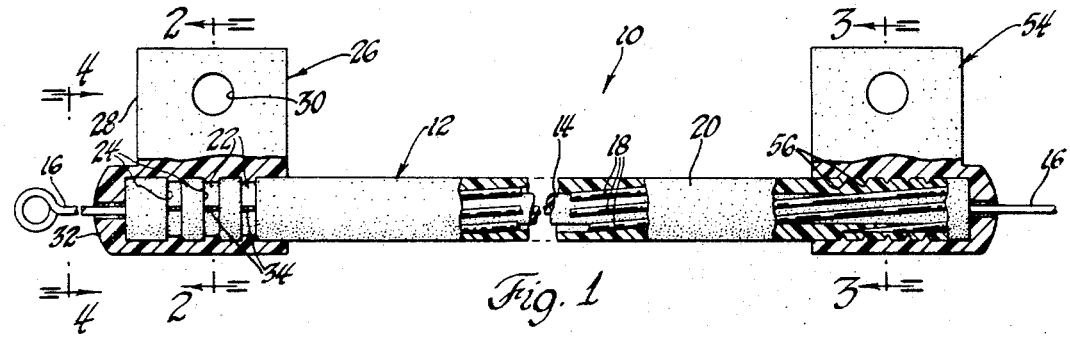
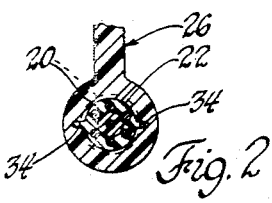
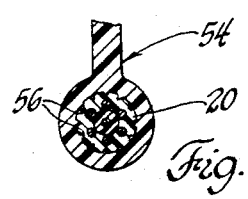
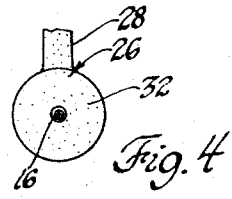
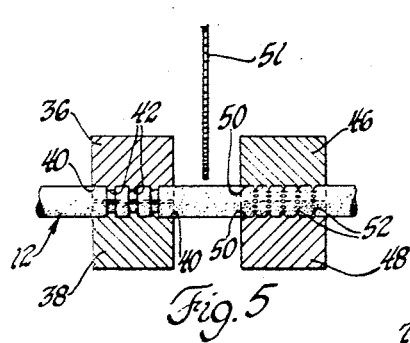
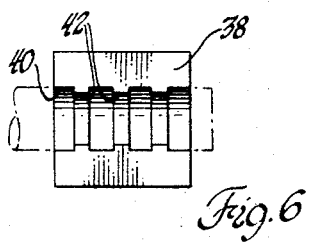
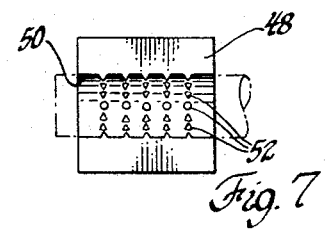
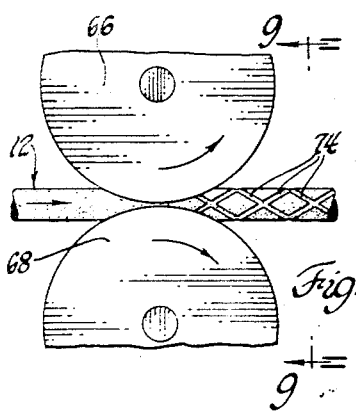
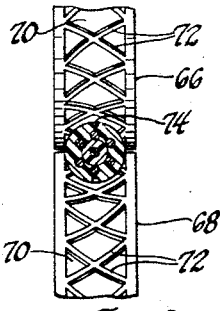
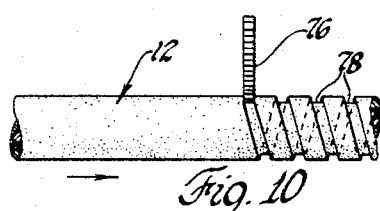
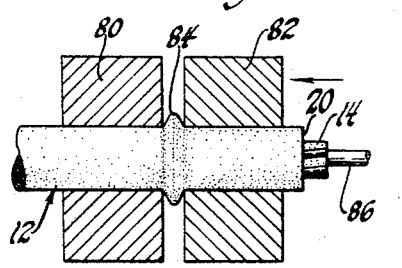
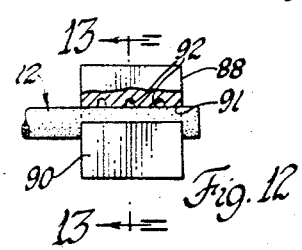
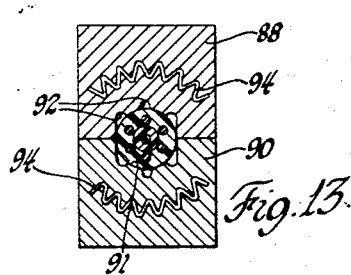
INVENTOR.
Winthrop B. Conrad
BY
Barnard, McLynn Luing
ATTORNEYS March 25, 1969 W. B. CONRAD 3,435,107
METHOD OF MANUFACTURING A MOTION TRANSMITTING
REMOTE CONTROL ASSEMBLY
Filed May 18, 1967 Sheet 2 of 2

INVENTOR.
Winthrop B. Conrad
BY
Barnard, McGlynn & Reising
ATTORNEYS 3,435,107
METHOD OF MANUFACTURING A MOTION TRANSMITTING REMOTE CONTROL ASSEMBLY
Winthrop B. Conrad, Franklin, Mich., assignor to Teleflex Incorporated, North Wales, Pa., a corporation of Delaware
Continuation-in-part of application Ser. No. 551,422, May 19, 1966. This application May 18, 1967, Ser. No. 643,011
Int. Cl. B29d 3/02; F16c 1/10
U.S. Cl. 264—159                                     22 Claims

ABSTRACT OF THE DISCLOSURE

A method of manufacturing a motion transmitting remote control assembly utilizing a conduit for movably supporting a motion transmitting core element and having a substantially smooth outer surface of organic polymeric material and a fitting of organic polymeric material disposed about the conduit and adapted for attachment to a support structure. The method comprises the steps of forming irregularities in and along at least a portion of the organic polymeric material of the smooth outer surface of the conduit and subsequently molding a support fitting of organic polymeric material about at least some of the irregularities along a portion of the length of the conduit so that the fitting is disposed in mechanical interlocking engagement with the conduit for supporting the conduit.

---

This application is a continuation-in-part of application Ser. No. 551,422, filed May 19, 1966.

Motion transmitting remote control assemblies of the type to which the instant invention pertains are frequently utilized in marine, aircraft and automotive installations and usually include a conduit with fittings disposed adjacent each end for attaching the conduit to a support structure, and a motion transmitting core element movably disposed in the conduit. One end of the core element is usually adapted to be manually moved and the other end is adapted to be attached to a control member of a device to be actuated. Assemblies of this type are frequently utilized in automobiles to control such things as vents, heaters, and the like. A typical conduit utilized in such assemblies includes an inner tubular element of organic polymeric material with a plurality of wires wrapped about the inner tubular member on a long lead and a casing of organic polymeric material surrounding the wires and the inner tubular member. Fittings are secured to the casing and are adapted to be secured to a support structure.

Fittings utilized to support such conduits must not apply excessive radial forces to the conduit because such forces deform the conduit to interfere with the movement of the motion transmitting core element. The fittings, however, must be secured to the conduit sufficiently to prevent relative axial movement between the conduit and the fitting to prevent the conduit from being pulled from the fitting. Furthermore, when a fitting is utilized to support a plastic-encased conduit of the type utilizing a plurality of wires helically wound around an inner tubular element, the fitting must, in addition to maintaining the conduit substantially free of excessive radial forces while preventing axial movement of the conduit within the fitting, allow movement of the individual wires relative to one another and relative to the inner tubular member and the outer plastic casing so that the conduit is flexible along its entire length.

One type of fitting which has heretofore been utilized is one which is clamped about the conduit. Such fittings have not proven satisfactory in the remote control assemblies utilizing a conduit of the type mentioned above because, in order to obtain sufficient frictional gripping between the fitting and the outer plastic casing of the conduit, the fitting applies excessive radial forces to the conduit to deform the conduit and interfere with the movement of the motion transmitting core element. Another type fitting heretofore utilized is one made of plastic or organic polymeric material and molded about the casing of the conduit so that the organic polymeric material of the casing of the conduit is diffused into the organic polymeric material of the fitting, and vice versa. In order to obtain a diffusion of the organic polymeric material of the casing with the organic polymeric material of the fitting, however, it is necessary that the organic polymeric material of the fitting be compatible for such bonding to the organic polymeric material of the casing. It is frequently necessary to form the fitting of an organic polymeric material having high strength characteristics, yet such organic polymeric materials are frequently not compatible for bonding to the organic polymeric material preferably utilized in the outer casing of the conduit. When a fitting of an organic polymer material incompatible for bonding to the organic polymeric material of the casing is molded about the casing, there is no diffusion between the organic polymeric materials of the fitting and the casing, and there is not sufficient frictional contact between the fitting and the casing of the conduit to prevent the conduit from being pulled from the fitting under normal operating conditions.

One attempt to solve this problem has been to force the organic polymeric material of the fitting into the casing. This has not proven satisfactory, however, since it results in a concave or arcuately shaped depression in the conduit with the fitting having a mating projection. Such a construction is sometimes suitable for assemblies wherein the motion transmitting core element rotates within the conduit and the axial forces tending to pull the conduit from the end fitting are inconsequential. However, such a structure is not satisfactory when the motion transmitting core element is slidably disposed in the conduit and applies significant axial forces tending to remove the conduit from the fitting because the arcuate interconnection formed as the fitting is forced onto the conduit to deform the conduit does not provide sufficient retention of the conduit within the fitting.

Accordingly, it is an object and feature of this invention to provide a motion transmitting remote control assembly having a conduit with an outer surface of organic polymeric material having irregularities preformed along the outer surface of the conduit and a fitting of organic polymeric material molded about the conduit and the irregularities so that the fitting is disposed in mechanical interlocking engagement with the conduit.

In general, these and other objects and features of this invention may be attained in a motion transmitting remote control assembly including a conduit having an inner tubular member of organic polymeric material with a bore therethrough for movably supporting a motion transmitting core element, a plurality of wires wrapped helically about the inner tubular member on a long lead, and an outer smooth tubular casing of organic polymeric material enclosing the wires and the inner tubular member. Irregularities are formed in the surface of the outer casing without deforming the wires and without decreasing the inner diameter of the casing. In one preferred embodiment, the irregularities take the form of annular grooves disposed circumferentially about the casing with the sides of the grooves being substantially perpendicular to the longitudinal axis of the conduit. A fitting of organic polymeric material is molded about the conduit with portions of the fitting disposed in the grooves so that the fitting is in mechanical interlocking engagement with the casing of the conduit. In another preferred embodiment, the irregularities are formed by forcing a plurality of spikes into the casing of the conduit and thereafter molding a fitting of oragnic polymeric material about the casing so that portions of the fitting are disposed in the irregularities formed by the spikes to provide mechanical interlocking engagement between the fitting and the casing of the conduit. In a further embodiment, the irregularities are formed by at least one projection resulting from deforming the organic polymer material of the casing with the fitting of organic polymeric material molded about the projection so that the fitting is in mechanical interlocking engagement with the casing of the conduit. In a still further embodiment, the irregularities are formed by a groove cut into the casing and the fitting of organic polymeric material is molded about the groove so that the fitting is in mechanical interlocking engagement with the casing of the conduit.

Other objects and attendant advantages of the present invention will be readily appreciated as the same becomes better understood by reference to the following detailed description when considered in connection with the accompanying drawings wherein:

FIGURE 1 is a view partially broken away and in cross section of a preferred embodiment of the instant invention;

FIGURE 2 is a fragmentary cross sectional view taken substantially along line 2—2 of FIGURE 1;

FIGURE 3 is a fragmentary cross sectional view taken substantially along line 3—3 of FIGURE 1;

FIGURE 4 is a view taken substantially along line 4—4 of FIGURE 1;

FIGURE 5 is a cross sectional view showing an embodiment of means for forming irregularities in the conduit;

FIGURE 6 is a view showing another embodiment of means for forming the irregularities in the conduit;

FIGURE 7 is a view showing still another embodiment of means for forming the irregularities in the conduit;

FIGURE 8 is a view of yet another embodiment of means for forming the irregularities in the conduit;

FIGURE 9 is a view taken substantially along line 9—9 of FIGURE 8;

FIGURE 10 is a view showing a further embodiment of means for forming the irregularities in the conduit;

FIGURE 11 is a view showing a still further embodiment of means for forming the irregularities in the conduit;

FIGURE 12 is a view showing another embodiment of means for forming the irregularities in the conduit;

FIGURE 13 is an enlarged cross sectional view taken substantially along line 13—13 of FIGURE 12;

Figure 14:
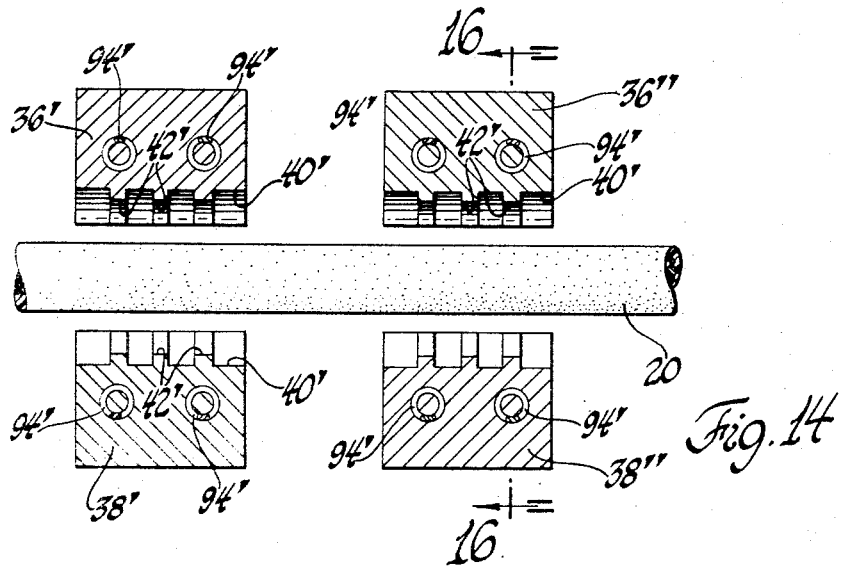
FIGURE 14 shows yet another embodiment for forming the irregularities in the conduit.

Referring now to the drawings, wherein like numerals indicate like or corresponding parts throughout the several views, a motion transmitting remote control assembly constructed in accordance with the instant invention is generally shown at 10. The motion transmitting remote control assembly utilizes a conduit, generally indicated at 12, which includes an inner tubular member 14 of organic polymeric material having a bore of substantially uniform cross section throughout its entire length for movably supporting a motion transmitting core element 16. A plurality of wires 18 are wrapped helically about the inner tubular member 14 on a long lead. The wires 18 are shiftable relative to the inner tubular member 14 and relative to the casing 20 so that the conduit 12 is flexible. An outer smooth tubular casing 20 of organic polymeric thermoplastic material surrounds and encloses the wires 18 and the inner tubular member 14. While the inner tubular member 14 may be made of various organic polymeric materials, it is preferred that it be made of an extruded organic polymeric material having inherent lubricity. Highly desirable materials are the superpolyamide resins, commonly known as nylon, and polytetrafluoroethylene, also known as Teflon. Also, in some environments, less expensive organic polymeric materials such as polyethylene, polypropylene, etc. may be used to advantage. Any of the aforementioned organic polymeric materials may also be used for the casing 20 although polyethylene, polypropylene, etc. are preferable.

The casing 20 has irregularities preformed in the surface thereof without bending the wires 18 and while maintaining the inner diameter of the casing 20 substantially constant so as not to deform the inner tubular member 14, which would interfere with the movement of the motion transmitting core element 16. In one preferred form, the irregularities in the casing 20 comprise the annular grooves 22 disposed circumferentially about the casing 20. The sides 24 of the grooves 22 are substantially perpendicular to the longitudinal axis of the conduit. The fitting, generally indicated at 26, is of organic polymeric material and molded about the casing 20 with portions disposed in the annular grooves 22 so that the fitting is disposed in mechanical interlocking engagement with the casing 20 of the conduit 12. It is important to note that the radial sides 24 of the grooves 22 provide well-defined interfaces to provide the mechanical interlocking engagement between the fitting and the casing. The fitting 26 is adapted to be attached to a support by the flange 28 and the hole 30. The fitting 26 is also molded to include a cap 32 which abuts the end of the conduit and has a hole therein for movably supporting the motion transmitting core element 16. Preferably, there is also included the projections 34 which extend radially from the casing 20 so that when the fitting 26 is molded about the casing 20 it encapsulates the projections 34, thus increasing the force necessary to pull the conduit 12 from the fitting 26.

The grooves 22 are preformed in the casing 20 of the conduit 12 by moving two relatively movable members 36 annd 38 toward one another to surround the casing 20, as best illustrated in FIGURE 5. Each of the members 36 and 38 has a semicircular recess 40 therein and includes raised portions comprising the annular rings 42 which deform the casing 20 for forming the annular grooves 22. Preferably, the members 36 and 38 are moved together to force the organic polymeric material of the casing 20 to move from the area where the grooves 22 are formed in the casing 20 to a position between the members 36 and 38, which is indicated in dashed lines in FIGURE 5, to form the projections 34. Normally, a mandrel is inserted into the bore of the inner tubular member 14 before the members 36 and 38 are clamped onto the conduit to maintain the diameter of the bore in the inner tubular element 14; however, such a mandrel is not necessary in all instances.

In another preferred form, the irregularities in the casing 20 of the conduit are formed by the two relatively movable members 46 and 48, as best illustrated in FIGURE 5. The members 46 and 48 each have a semicircular recess 50 so that the members 46 and 48 may be moved toward one another to surround the conduit 12. The members 46 and 48 include raised portions comprising a plurality of spikes 52. The spikes 52 form irregularities in the conduit and, as best illustrated in FIGURES 1 and 3, a fitting, generally indicated at 54, is molded about the casing 20 of the conduit so that portions 56 of the fitting 54 are disposed in the irregularities formed by the spikes 52 whereby the fitting 54 is disposed in mechanical interlocking engagement with the casing 20 of the conduit 12.

It will be understood that the members 36 and 38 may be positioned adjacent the end of a conduit to form the annular grooves 22 in the conduit or, alternatively, the members 46 and 48 may be utilized; but in either case, the conduit will have been previously severed. Normally, the conduit 12 is fabricated in one continuous length by an extrusion process and is thereafter severed into predetermined lengths for forming the motion transmitting remote control assemblies. Normally, the continuous length of conduit is advanced a predetermined length and grasped between relatively movable members or jaws adjacent to a position where it is severed to provide a piece of conduit for use in a remote control assembly. After being severed, the conduit is advanced another predetermined length and severed again to produce a second piece of conduit for utilization in a remote control assembly. In the method as illustrated in FIGURE 5, the conduit 12 is being severed into predetermined lengths by the cutting element 51. The respective pairs of relatively movable members 36, 38 and 46 and 48 engage the conduit 12 on each side of the cutting element 51. Thus, irregularities are formed in the casing 20 of the conduit 12 adjacent the respective ends of the pieces of conduit to be utilized in the motion transmitting remote control assembly. It is to be understood that two pair of relatively movable members 36 and 38 may be utilized instead of utilizing the members 46 and 48 and conversely two pair of relatively movable members 46 and 48 may be utilized instead of utilizing the relatively movable members 36 and 38.

In another form, the relatively movable members comprise a pair of juxtaposed rotatable roller-like elements 66 and 68, as illustrated in FIGURES 8 and 9. The roller-like elements 66 and 68 each have a recess 70 thereabout with raised portions 72 disposed in the recesses. The conduit is passed between the roller-like elements 66 and 68 so as to be disposed in the recesses 70 as the roller-like elements 66 annd 68 rotate whereby the raised portions 72 deform the conduit 12 to form the irregularities 74 along the conduit. In forming the irregularities 74 in the conduit 12 as illustrated in FIGURES 8 and 9, the entire length of the conduit 12 is so deformed; however, fittings are normally molded about only the ends of each predetermined length of the conduit utilized for a motion transmitting remote control assembly. It will be understood that the raised portions 72 in the recesses 70 of the roller-like elements 66 and 68 may take any appropriate form to form many various patterns on the conduit 12.

Another form is illustrated in FIGURE 10 wherein the conduit 12 is moved axially and a cutting element 76 is positioned in contact with the outer surface of the conduit 12. The cutting element 76 is rotated about the conduit 12 to cut the irregularities taking the form of a helical groove 78 in the outer surface of the conduit. Alternatively, the cutting element 78 may be maintained stationary while the conduit 12 is rotated.

Another form is illustrated in FIGURE 11 wherein relatively movable members 80 and 82 are axially spaced along the conduit 12 and respectively surround the conduit. The members 80 and 82 may be hinge-type clamp members or in any other appropriate form to engage and surround the conduit 12. The members 80 and 82 tightly engage the outer casing 20 of the conduit 12 and are moved relative to one another axially along the conduit to force the organic polymeric material of the outer surface of the casing 20 of the conduit 12 into a projection 84. In some instances, it is preferable to heat the outer casing 20 of the conduit 12 so that the projection 84 is more easily formed. The mandrel 86 is disposed in the bore of the inner tubular member 14 before the members 80 and 82 are placed into tight engagement about the casing 20. A mandrel, such as mandrel 86, may be utilized in the other forms discussed hereinabove. A fitting of organic polymeric material is then molded about the conduit 12 and about the projection 84 so that the fitting is disposed in mechanical interlocking engagement with the casing 20 of the conduit 12.

Another form is illustrated in FIGURES 12 and 13 wherein there is shown the members 88 and 90 disposed about the conduit 12. The members 88 and 90 include recesses 91 for contacting the conduit with cavities 92 extending into the members away from the surface of the conduit and heating elements 94. The members 88 and 90 are placed about the conduit 12 and the conduit 12 is heated so that the organic polymeric material of the casing 20 moves into the cavities 92 to form projections on the conduit. A fitting of organic polymeric material is then molded about the conduit to encapsulate the projections formed by the cavities 92 so that the fitting is in mechanical interlocking engagement with the casing 20 of the conduit 12.

Figure 15:
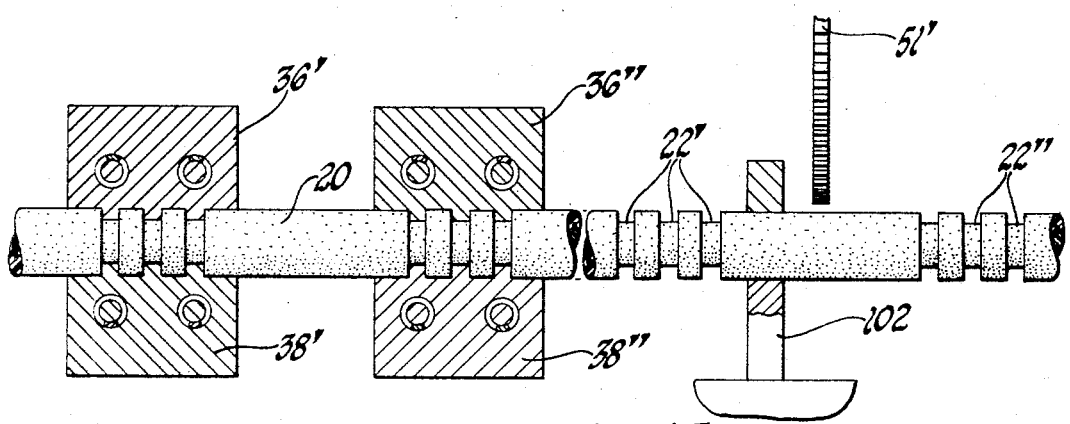
FIGURE 15 is a view similar to FIGURE 14 but showing the members moved together and into engagement with one another for forming the irregularities.
Figure 16:
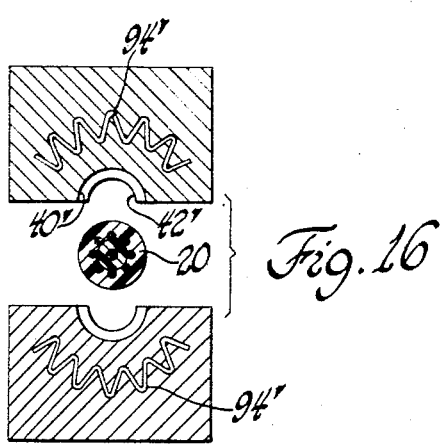
FIGURE 16 is a cross sectional view taken substantially along line 16—16 of FIGURE 14.

The form illustrated in FIGURES 14 through 16 is related in the forms illustrated in FIGURES 5 and 13 in that there is included a conduit having an outer casing 20 into which irregularities are formed by the relatively movable members 36', 38', 36" and 38". The irregularities take the form of grooves 22' and 22" as best illustrated in FIGURE 15. The grooves 22' are formed by compressing the conduit between the first pair of relatively movable members 36' and 38' while the grooves 22" are formed by compressing the conduit between the second pair of relatively movable members 36" and 38". As best illustrated in FIGURES 14 and 16, each of the members 36', 38', 36" and 38" has a semicircular recess 40' therein and includes raised portions comprising the annular rings 42' which deform the casing 20 for forming the annular grooves 22' and 22". Each of the relatively movable members 36', 38', 36" and 38" includes heating elements 94' for heating the casing 20 of the conduit.

There is also included a jaw or clamping means 102 for holding the conduit while the cutting element 51' severs the conduit at a position between the first and second pairs of grooves 21' and 21". The relatively movable first pair of members 36' and 38' and the relatively movable second pair of members 36" and 38" are actuated by an appropriate control means whereby the relatively movable members 36' and 38' are moved into initial contact with the casing 20 of the conduit so that the annular rings 42' are in engagement with the outer surface of the casing 20. The relatively movable members 36' and 38' are maintained substantially stationary in this position for a short period of time while the casing 20 is being heated. After the casing has been heated, the relatively movable members 36' and 38' are slowly moved together and into the casing 20 to form the annular grooves 22'.

In a like manner, the relatively movable members 36" and 38" are moved together to form the annular grooves 22". The members are moved together to initially contact the conduit while the conduit is being heated and are thereafter moved together slowly so as not to deform the inner bore of the conduit. The total movement for each pair of relatively movable members to move into engagement with the casing 20 and then into engagement with one another to form the grooves takes but a second or two; this, however, is slow as compared to hitting or stamping the conduit which is at ambient temperature between two similar relatively movable members.

The conduit is heated to a temeprature which is always below the melting temperature of the organic polymeric material of the conduit. Preferably the members 36' and 38', as well as the members 36" and 38", are subjected to a certain force or pressure which urges them together. Hence, the members are moved into engagement with the conduit and when the conduit has been heated sufficiently to flow the members move into engagement with one another to form the grooves. The forming of the grooves is therefore a combination of the force urging the members together and the temperature of the conduit. The conduit, however, is always subjected to a temperature which is below its melting temperature.

After the first and second sets of grooves 21′ and 22″ are formed into the conduit, the conduit is moved longitudinally of itself to a position where the grooves 22′ are disposed on one side of the cutting element 51′ and the grooves 22″ are disposed on the other side of the cutting element 51′ so that the conduit is severed between the grooves 22′ and the grooves 22″. Thereafter, a fitting is molded about each resulting end so that a fitting is disposed in mechanical interlocking engagement with a length of conduit through the grooves 22′ and another fitting is disposed in mechanical interlocking engagement with another length of conduit as a result of the grooves 22″.

The advantages in utilizing the heating step in the method is that a longer tool life is obtained because of less wear and the grooves or other irregularities formed in the casing of the conduit are much more sharply defined so as to provide a greater pull-off strength when a fitting is molded thereabout.

As alluded to hereinbefore, the preforming of the conduit 12 to provided irregularities in the organic polymeric outer surface thereof provides a motion transmitting remote control assembly wherein a fitting of organic polymeric material is molded about the conduit and in mechanical interlocking engagement with the conduit such that a high degree of pull-off strength is attained, i.e., a high amount of force is necessary to pull the conduit from the fitting. Such as assembly particularly solves the problem where it is necessary to mold the end fitting of an organic polymeric material which is incompatible for bonding to the organic polymeric material of the outer surface of the conduit. Various organic polymeric materials are suitable for forming the fittings molded about the conduit; however, because of the high degree of shrinkage as compared to other organic polymeric materials, acetal resins are preferred for forming the fittings.

The invention has been described in an illustrative manner and it is to be understood that the terminology which has been used is intended to be in the nature of words of description rather than of limitation.

The embodiments of the invention in which an exclusive property or privilege is claimed are defined as follows:

1. A method of manufacturing a motion transmitting remote control assembly utilizing a conduit for movably supporting a motion transmitting core element therein and having a substantially smooth outer surface of organic polymeric material and a fitting of organic polymeric material disposed about the conduit and adapted for attachment to a support, said method comprising forming irregularities in and along at least a portion of the organic polymeric material of the smooth outer surface of the conduit, and subsequently molding a support fitting of organic polymeric material which becomes substantially rigid about at least some of said irregularities along a portion of the length of the conduit so that the fitting is disposed in mechanical interlocking engagement with the conduit for supporting the conduit.

2. The method as set forth in claim 1 including disposing at least one member having recesses contacting the surface of the conduit with cavities therein extending away from the surface of the conduit, heating said conduit so that the organic polymeric material of the surface thereof moves into said cavities to form projections on said conduit, and molding said fitting about said projections to form said mechanical interlocking engagement.

3. The method as set forth in claim 1 including moving said conduit axially, positioning a cutting element in contact with the outer surface of said conduit, and providing relative rotation between said conduit and said cutting element to cut said irregularities in the form of a helical groove in said outer surface of said conduit.

4. The method as set forth in claim 1 including heating said conduit to soften said conduit for forming said irregularities therein.

5. The method as set forth in claim 1 wherein forming said irregularities includes compressing said conduit between two relatively movable members to deform the outer surface of said conduit.

6. The method set forth in claim 5 including disposing said relatively movable members in axially spaced relationship with one another along said conduit, moving said members relative to one another axially along said conduit to force the organic polymeric material of the outer surface of said conduit into a projection, and molding said fitting about said projection to form said mechanical interlocking engagement.

7. The method as set forth in claim 5 including forming said irregularities by compressing said conduit between two relatively movable members having recesses therein for engaging the conduit and raised portions in the recesses.

8. The method as set forth in claim 7 including moving said relatively movable members toward one another to surround said conduit and forming a plurality of spike holes in said conduit to define said irregularities with raised portions which comprise a plurality of spikes, and molding said fitting about said conduit so that portions of said fitting are disposed in said spike holes to provide said mechanical interlocking engagement.

9. The method as set forth in claim 7 wherein said relatively movable members comprise a pair of juxtaposed rotatable roller-like elements having said recesses disposed thereabout with said raised portions disposed therein for engaging said conduit, and including passing said conduit between and in the recesses of said roller-like elements as said roller-like elements rotate so that said raised portions deform said conduit to form said irregularities therealong.

10. The method as set forth in claim 7 including moving said relatively movable members toward one another to surround said conduit and forming annular grooves disposed circumferentially about said conduit to define said irregularities with raised portions which comprise annular rings.

11. The method as set forth in claim 10 including forcing organic polymeric material of said conduit between said relatively movable members as the latter are moved together to form projections on said conduit, and molding said fitting about said conduit so as to be disposed in said grooves and about said projections to provide said mechanical interlocking engagement.

12. The method as set forth in claim 10 including heating said conduit so that the organic polymeric material of said conduits is softened to facilitate the forming of said annular grooves therein.

13. The method as set forth in claim 12 including slowly moving said members toward one another.

14. The method as set forth in claim 13 including moving said members into contact with said conduit, heating said conduit with said members as the latter remain stationary, and applying a force to said members to move said members into engagement with one another at a relative velocity which is a function of the softness of the conduit as determined by the temperature to which the conduit has been heated while maintaining the temperature of the conduit below its melting temperature.

15. The method as set forth in claim 14 including forcing organic polymeric material of said conduit between said relatively movable members as the latter are moved together to form projections on said conduit, and molding said fitting about said conduit so as to be disposed in said grooves and about said projections to provide said mechanical interlocking engagement.

16. The method as set forth in claim 7 including compressing said conduit between a first pair of said relatively movable members to form first irregularities along said conduit, compressing said conduit between a second pair of said relatively movable members which are spaced axially along said conduit from said first pair to form second irregularities along said conduit, severing said conduit at a position between said first and second irregularities, and molding a fitting about each of said irregularities at the severed ends of said conduit.

17. The method as set forth in claim 16 including heating each pair of said members for softening the organic polymeric material of said conduit.

18. The method as set forth in claim 17 including slowly moving the members of each pair toward one another.

19. The method as set forth in claim 18 including moving the members of each pair into contact with the conduit, heating the conduit with the members as the members remain substantially stationary, and moving the members of each pair into engagement with one another and into the conduit to form said irregularities.

20. A method of manufacturing a motion transmitting remote control assembly utilizing a conduit including an inner tubular member of organic polymeric material having a bore for movably supporting a motion transmitting core element therein and a plurality of wires wrapped helically about said inner tubular member on a long lead and an outer smooth tubular casing of organic polymeric thermoplastic material enclosing said wires and said inner tubular member with a fitting of organic polymeric material disposed about said conduit and adapted for attachment to a support, said method comprising: heating the conduit and comprising said conduit between two relatively movable members having recesses therein for engaging said casing with raised portions in the recesses for deforming said outer smooth surface of said tubular casing to form irregularities therein without deforming said wires and without deforming the diameter of said bore; and subsequently molding a fitting of an organic polymeric material which is incompatible for bonding to the organic polymeric material of said casing, about said irregularities of said tubular casing so that said fitting is disposed in mechanical interlocking engagement with said conduit.

21. The method as set forth in claim 20 including forming annular grooves in said casing with annular rings comprising the raised portions, moving the members toward one another and into engagement with the casing of the conduit, heating the casing while maintaining the members substantially stationary and thereafter moving the members into engagement with one another to form the grooves.

22. The method as set forth in claim 21 including forcing organic polymeric material of the casing between the members and forming circumferentially spaced projections extending radially from the casing, and molding the fitting about the casing so as to be disposed in the grooves and about the projections to provide the mechanical interlocking engagement.

References Cited

UNITED STATES PATENTS

| | | | |
|---|---|---|---|
| 1,395,410 | 11/1921 | Hassler | 264—293 X |
| 2,175,099 | 10/1939 | Abbott | 264—172 X |
| 2,420,614 | 5/1947 | Norman | 264—239 |
| 2,583,026 | 1/1952 | Swift | 264—274 X |
| 2,822,600 | 2/1958 | Scott | 264—162 X |
| 3,013,310 | 12/1961 | Foster et al. | |
| 3,263,520 | 8/1966 | Tschanz | 264—271 X |
| 3,294,885 | 12/1966 | Cines et al. | 264—99 |

ROBERT F. WHITE, *Primary Examiner.*

T. J. CARVIS, *Assistant Examiner.*

U.S. Cl. X.R.

264—251, 274, 293; 74—502